UNITED STATES PATENT OFFICE.

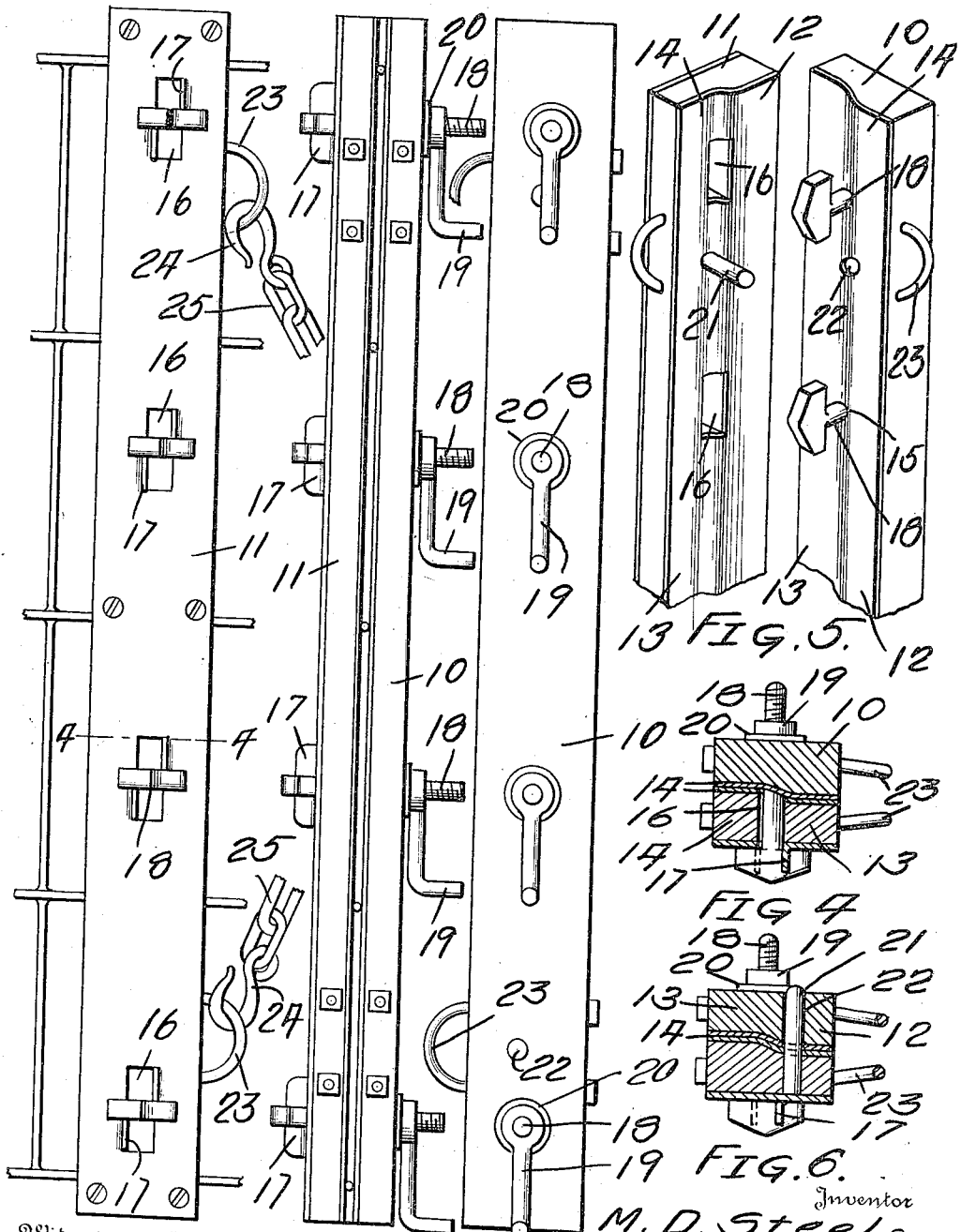

MACK D. STEELE, OF BLACKSVILLE, WEST VIRGINIA, ASSIGNOR OF ONE-HALF TO JAMES I. MILLER, OF BLACKSVILLE, WEST VIRGINIA.

WIRE-STRETCHER CLAMP.

1,195,525.  Specification of Letters Patent.  Patented Aug. 22, 1916.

Application filed March 1, 1915. Serial No. 11,223.

*To all whom it may concern:*

Be it known that I, MACK D. STEELE, a citizen of the United States, residing at Blacksville, in the county of Monongalia, State of West Virginia, have invented certain new and useful Improvements in Wire-Stretcher Clamps; and I do hereby declare the following to be a full, clear, and exact description of the invention, such as will enable others skilled in the art to which it appertains to make and use the same.

This invention relates to improvements in wire stretchers and particularly to an improved clamp for use in holding woven wire fences.

One object of the invention is to provide a simple device of this character which is effective in its clamping action and which can quickly and easily be applied to or removed from the wire, without disengagement of the clamping nuts.

Another object is to provide novel means for detachably holding the clamping bars of the device.

Other objects and advantages will be apparent from the following description when taken in connection with the accompanying drawing.

In the drawing Figure 1 is an elevation of my device, in use, Fig. 2 is an edge view, Fig. 3 is a plan view of the opposite side of the device from that shown in Fig. 1, Fig. 4 is a transverse section on the line 4—4 of Fig. 3. Fig. 5, is a detail perspective view of portions of the bars employed in carrying out the invention, and Fig. 6, is a transverse section similar to Fig. 4, and showing the connecting pins for the bars.

Referring particularly to the accompanying drawing, 10 and 11 represent a pair of elongated bars formed preferably of wood and having their abutting faces formed with interlocking elevations 12 and depressions 13 which extend throughout the length of the bars. These abutting faces are covered with some material, such as metal plates 14 to protect them against undue wear. Formed through the bar 10 are a plurality of openings 15 and through the bar 11 are elongated openings 16 which register with the openings 15 when the bars are in engaged position. On opposite sides of the openings 16, and adjacent the opposite ends are the outstanding lugs 17, the inner ends of which are so spaced as to provide a transverse space across the opening 16.

Disposed through the openings 15 are bolts 18, the threaded ends of which project beyond the outer face of the bar 10 and carry the crank nuts 19, suitable washer plates 20 being disposed between the nuts and the face of the bar. In the forward end of each of the bolts is a flattened head which readily passes through one of the openings 16 and is adapted to be turned transversely of the opening so that it abuts against the adjacent ends of the lugs 17. The crank nuts are then turned so as to draw the heads downwardly and firmly force the bars together to clamp the wire therebetween.

In the inner face of the bar 11 are the pins 21 which are received in openings 22 formed in the bar 10. On the rear edges of the bars 10 and 11 are loops or staples 23 which are adapted to receive the hooks 24 carried by the opposite ends of a chain 25, this chain being arranged to be connected to any suitable stretching device.

Particular attention is called to the fact that two rigid bars are provided so that when the crank nuts are screwed tightly, uniform pressure would be exerted on the wire fabric at all points engaged by the bars.

Attention is called to the fact that by the construction of the bolts, the clamping bars can be quickly and easily attached to or detached from the wire fabric without the necessity of removing the nuts or removing any of the parts, except the bar 11. Thus all of the parts are kept intact, danger of losing any of them being eliminated.

What is claimed is:

1. A wire stretcher clamp comprising a pair of rigid bars, clamping bolts carried by one of the bars and provided with flattened heads, the other bar being formed with elongated openings for the reception of the flattened heads, said heads being arranged to be turned transversely of the elongated openings, stop members disposed adjacent the elongated openings for engagement with the said heads and means carried by the other ends of the bolts for drawing the bars together for clamping engagement with a fence wire.

2. In a device of the class described, a pair of bars, the said bars being provided with openings adapted for registration, one of said bars being provided on its outer face with a plate having an opening alined with the openings in said bars, the metal adjacent said plate openings being turned outwardly adjacent the ends of said openings and on opposite sides to provide stops, the said stops being spaced apart to provide a laterally disposed slot, a bolt adapted for insertion through each of said openings in said bars, a head on each bolt adapted to lie in said slots to be engaged on opposite sides by said stops, and a nut on the opposite ends of said bolts.

In testimony whereof, I affix my signature, in the presence of two witnesses.

MACK D. STEELE.

Witnesses:
J. I. MILLER,
JIM BURKE.

Copies of this patent may be obtained for five cents each, by addressing the "Commissioner of Patents, Washington, D. C."